R. FRIDAY.
Seed-Planters.

No. 136,231.

Patented Feb. 25, 1873.

UNITED STATES PATENT OFFICE.

REUBEN FRIDAY, OF CROCKETT, TEXAS.

IMPROVEMENT IN SEED-PLANTERS.

Specification forming part of Letters Patent No. 136,231, dated February 25, 1873.

*To all whom it may concern:*

Figure 1:
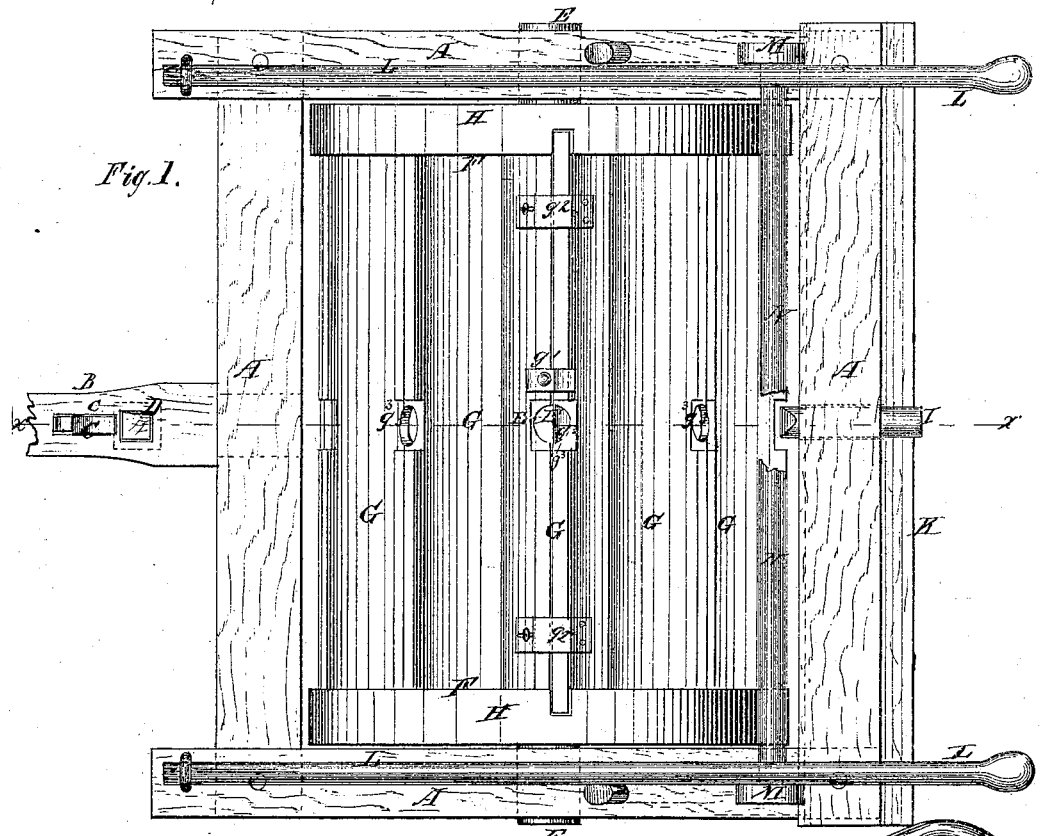
Figure 2:
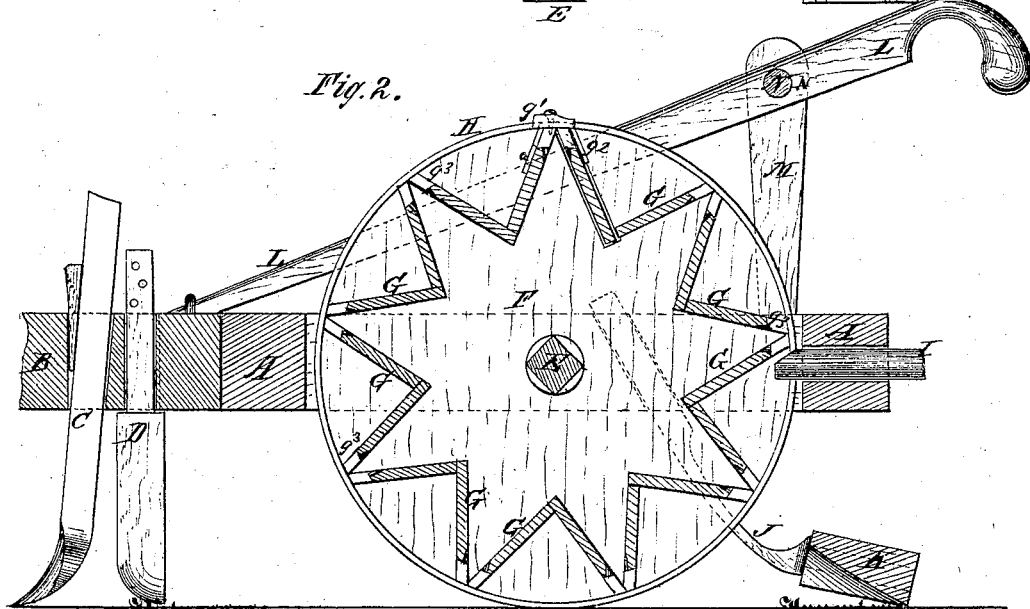

Be it known that I, REUBEN FRIDAY, of Crockett, in the county of Houston and State of Texas, have invented a new and useful Improvement in Seed-Planter, of which the following is a specification:

In the accompanying drawing, Figure 1 is a top view of my improved seed-planter. Fig. 2 is a detail vertical section of the same taken through the line $x\ x$, Fig. 1.

Similar letters of reference indicate corresponding parts.

The invention consists in an improvement of seed-planters, as hereinafter described and pointed out in the claim.

A is the frame of the machine, consisting of two side bars connected at their ends by two cross-bars. To the front cross-bar of the frame A, at its center, is attached the draw-bar B, to which the draft is applied. C is the plow that opens the furrow to receive the seed. The plow C is adjustably secured to the bar B by a wedge-key or other means, so that it may be conveniently raised and lowered, as circumstances may require. To the draw-bar B, directly in the rear of the opening-plow C, is attached a bar, D, the lower end of which is made V-shaped, so as to press open the furrow to receive the seed. The bar D is adjustable, so that it may be adjusted to correspond with the adjustment of the plow C, or may be removed when not required for use. E is a shaft, the journals of which revolve in bearings formed in or attached to the middle parts of the side bars of the frame A. To the shaft E, near its ends, are attached two circular disks, F, in the outer part of the inner sides of which are formed zigzag grooves to receive the ends of the plates G that form the body of the dropping-cylinder, and thus make said body star-shaped in its cross-section. The outer edges of each pair of plates G meet at the circumferences of the disks F. The plates G are secured in the grooves in the disks F by metallic bands or hooks H placed upon the said disks F, as shown in Figs. 1 and 2. One of the plates G is made detachable, a notch being formed in the bands H, so that it may be slipped out to form an opening for the convenient insertion of the seed. The movable plate G is secured in place by a button, $g^1$, pivoted to the edge of the adjacent plate G and by straps $g^2$ attached to the said movable plate, and which pass over the contiguous edges of the pair of plates and are caught upon knobs or catches attached to the stationary plate. The straps $g^2$ also serve as handles for removing and replacing said movable plate. In the center of the salient angles of the dropping-cylinder are formed holes $g^3$ of such a size as to allow the proper amount of seed for a hill to pass out, the edges of the plates at the holes $g^3$ being notched, as shown in Figs. 1 and 2, to allow the cleaner I to clean out any soil that might enter said holes and clog them. The cleaner I is attached to the center of the rear cross-bar of the frame A, and projects forward so as to enter the notches of the dropping-cylinder E F G H as the said cylinder revolves, and thus keep them clear. J are two curved spring-bars, the forward ends of which are adjustably attached to the side bars of the frame A, and to their rear ends are attached the ends of the covering-bar K, which is held down upon the surface of the ground by the elasticity of the bars J with sufficient force to cover the seed. The middle part of the under side of the said coverer K is concaved, as shown in Fig. 2, to give the proper form to the top of the ridge or row. L are the handles, the forward ends of which are attached to the forward part of the side bars of the frame A, and which are supported at the proper elevation by standards M, the lower ends of which are secured to the rear parts of the side bars of the frame A. The handles L are connected by a round, N, to keep them in proper relative position.

Having thus described my invention, I claim as new and desire to secure by Letters Patent—

The combination in a seed-planter, with the dropper and furrow-opener, of the pulverizer C, arranged in front thereof and in line therewith, as and for the purpose described.

REUBEN FRIDAY.

Witnesses:
F. M. OLIVER,
F. H. BAYNE.